July 10, 1956

W. E. PHILLIPS 2,754,429

LOAD CONTROL SYSTEMS FOR GENERATING UNITS

Filed Feb. 19, 1951

INVENTOR.
WILLIAM E. PHILLIPS

BY

*Woodcock and Phelan*
ATTORNEYS

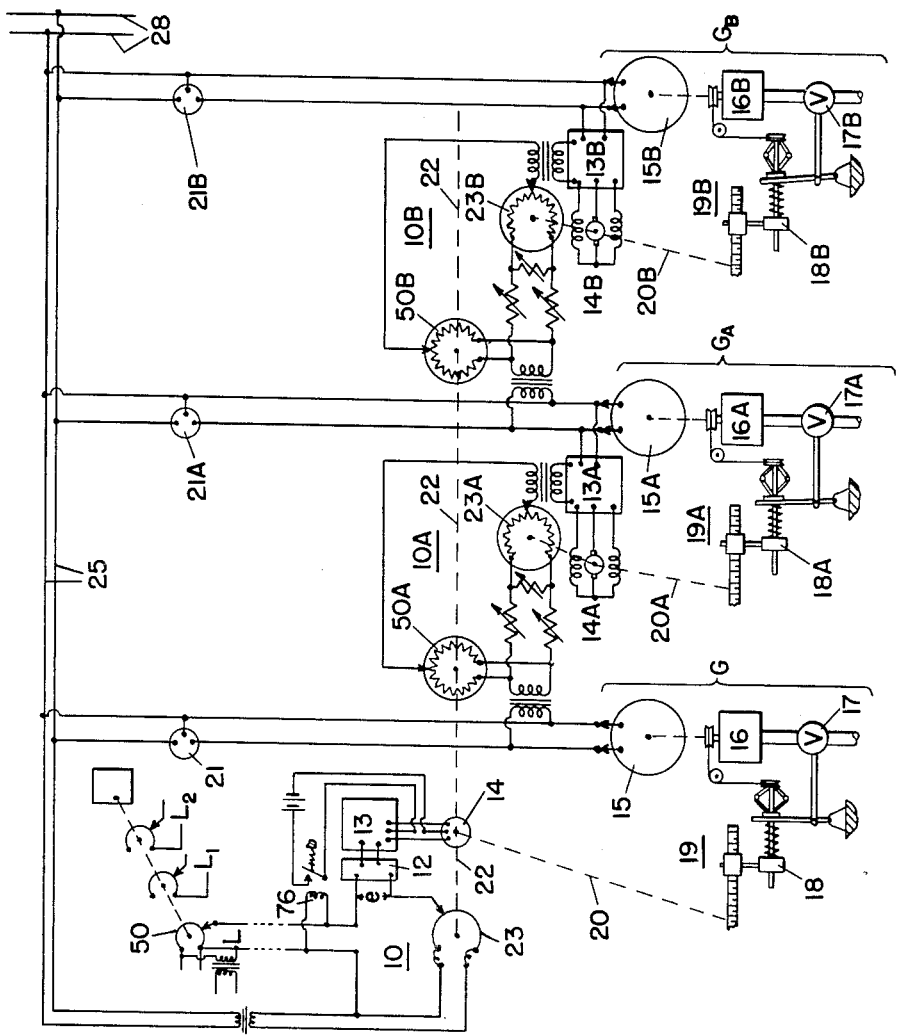

July 10, 1956 W. E. PHILLIPS 2,754,429
LOAD CONTROL SYSTEMS FOR GENERATING UNITS
Filed Feb. 19, 1951 7 Sheets-Sheet 5

INVENTOR.
WILLIAM E. PHILLIPS
BY
Woodcock and Phelan
ATTORNEYS

July 10, 1956 W. E. PHILLIPS 2,754,429
LOAD CONTROL SYSTEMS FOR GENERATING UNITS
Filed Feb. 19, 1951 7 Sheets-Sheet 6

INVENTOR.
WILLIAM E. PHILLIPS
BY
Woodcock and Phelan
ATTORNEYS

July 10, 1956  W. E. PHILLIPS  2,754,429
LOAD CONTROL SYSTEMS FOR GENERATING UNITS
Filed Feb. 19, 1951  7 Sheets-Sheet 7

INVENTOR.
WILLIAM E. PHILLIPS
BY
Woodward Phelan
ATTORNEYS

United States Patent Office 2,754,429
Patented July 10, 1956

2,754,429

LOAD CONTROL SYSTEMS FOR GENERATING UNITS

William E. Phillips, Drexel Hill, Pa., assignor to Leeds and Northrup Company, Philadelphia, Pa., a corporation of Pennsylvania Application February 19, 1951, Serial No. 211,663

25 Claims. (Cl. 307—57)

This invention relates to arrangements for controlling the load of generating units, stations or systems, interconnected to form a larger group in response to change in tie-line load, line frequency, or other primary quantity or variable.

It is a general object of the invention to have all controlled generating subdivisions of a larger group of units, stations or systems share, within limits of their regulating ability and selected maneuvering points, changes of power generation, so to preclude faster acting subdivisions from taking an undue share of load changes. The control system for each subdivision is of self-balancing type which, concurrently with its rebalancing, repositions the input-control member or members of the next smaller subdivision; the rebalancing, for a given change of the primary quantity, proceeding and being completed independently of the effect of the changed positions of the input-control members on the primary quantity.

In accordance with the invention, upon a given change in the primary quantity, there is at once automatically predetermined, as at a system load-dispatcher's office, what load change each controlled generating subdivision or station shall assume, whereupon the controlled generating units of each station at once start to shift to a new control point predetermined for that unit and stop shifting when that point is reached; the shifting may proceed continuously, or in steps, to match the desired rate of assumption or dropping of load by the individual unit as it approaches its new control point.

More specifically, a master controller at a system load-dispatcher's office converts deviations from a predetermined value of the primary quantity or quantities into a master signal including any one or more of the following control actions: proportional control, rate control (direct or inverse); reset action (continuous, intermittent or disappearing when the control point is reached); and a locking or freezing control which is effective upon failure of the master controller. A telemetric channel for each of the controlled-generating stations receives a station signal which is derived from and varies with the master signal and which is modified in accordance with base load and regulation limits of the particular station. Preferably, failure of a telemetric channel locks or freezes the control of the corresponding station. At each controlled station, the station signal is applied to a station controller which in turn applies to each of the one or more controlled units of that station a unit signal which varies with the station signal and which is modified in accordance with the selected base load and regulating limits of that unit. Thus, every controlled unit of the system at once responds to a change in tie-line load and/or frequency, picking up or dropping its predetermined allotted share of the load change and then operating about its new control point.

More particularly, for maintenance of the scheduled tie-line load of a system and for temporary sharing of the changes in load elsewhere in the net, a controller at the system load-dispatcher's office, in response to deviations in tie-line load and system frequency, effects a self-rebalancing adjustment and concurrently changes the adjustment of telemetric transmitters respectively corresponding with stations of its system, whereupon each station receives a signal corresponding with its share of the total load change required for correction of the tie-line load deviation. At each generating station, a station controller serves as a repeater quickly to reposition to predetermined extents the governors or input control members of the individually controlled generating units of that station. Thus, the input control members of all controlled generating units closely follow the dispatcher controller through a channel including the repeater controller of its station and the corresponding transmitter control of the dispatcher's station.

More particularly, the setting of the governor, gate or other input control member of the prime mover of each or one or more controlled generating units is varied, as by a motor, in response to changes in the system variable or primary quantity, and there is concurrently effected a rebalancing adjustment of a controller having a feedback loop which, as it does not include the power distribution system, insures that the setting of the input-control member will closely follow the system variable.

The invention further resides in systems and combinations having features of utility and novelty hereinafter described and claimed.

This application is in part a continuation of my co-pending application Serial No. 149,613, filed March 14, 1950, now abandoned.

For a more detailed understanding of the invention and for illustration of systems embodying it, reference is made to the accompanying drawings in which:

Figs. 1, 1A and 2 schematically illustrate generating stations each having a station controller for its generating units; Fig. 1B illustrates another form of station controller utilizable in the systems of Figs. 1 and 1A; Fig. 1C illustrates a modification of Fig. 1;

Fig. 3 illustrates a master controller at a system load-dispatcher's office for automatic control of several controlled stations of the system;

Fig. 4 diagrammatically illustrates a master controller of pneumatic type utilizable in the arrangements of Figs. 1–3;

Figure 8:
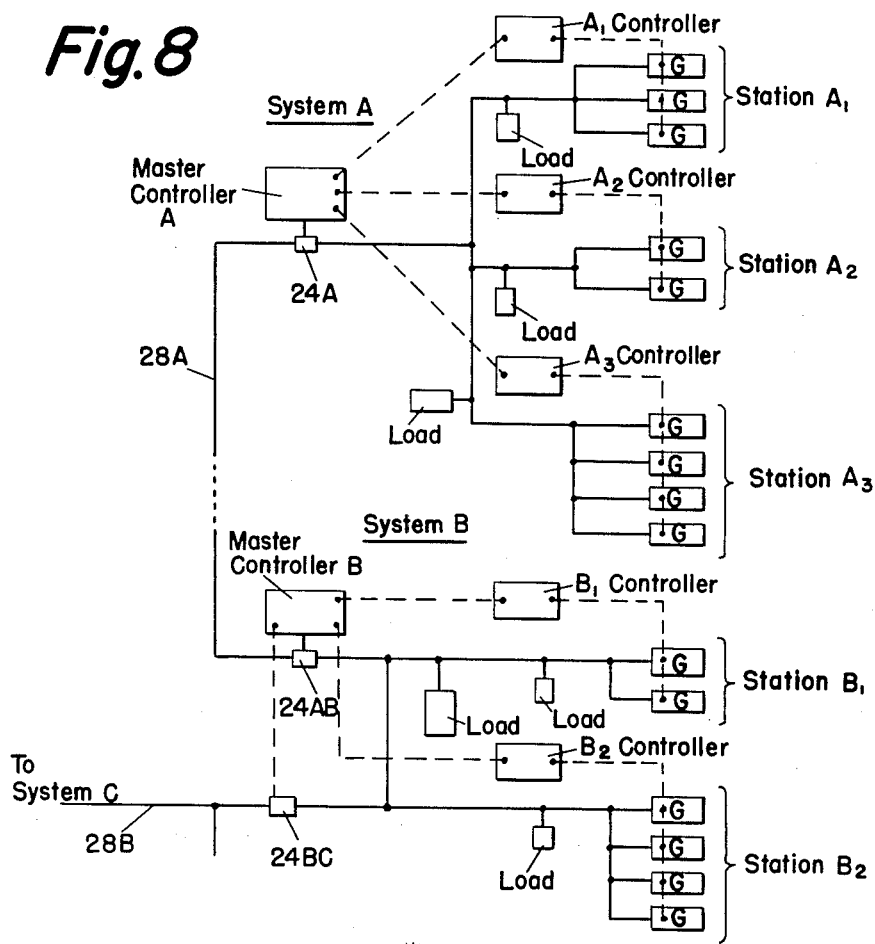
Figure 5:
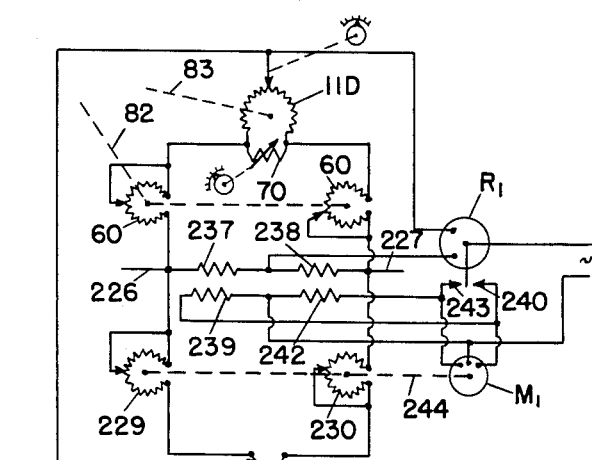
Figure 6:
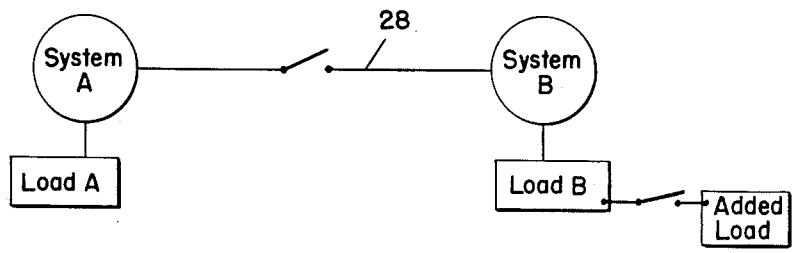
Figure 7:
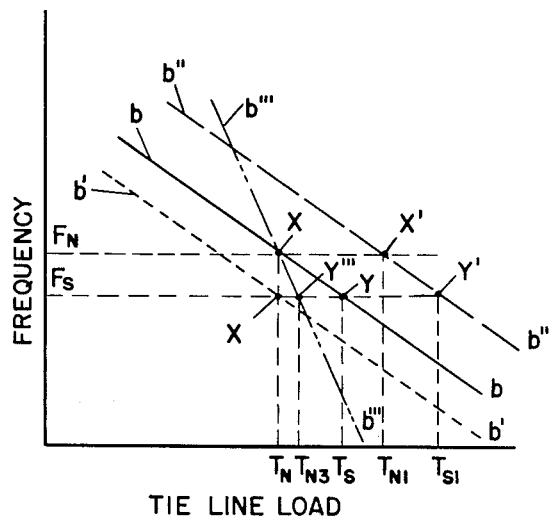

Fig. 5 schematically illustrates another electro-mechanical type of master controller utilizable in the systems of Figs. 1, 1A, 2 and 3;

Figs. 6 and 7 are explanatory figures referred to in discussion of tie-line load control; and Fig. 8 is a block diagram of part of a power net including systems with master controllers.

Figure 1:
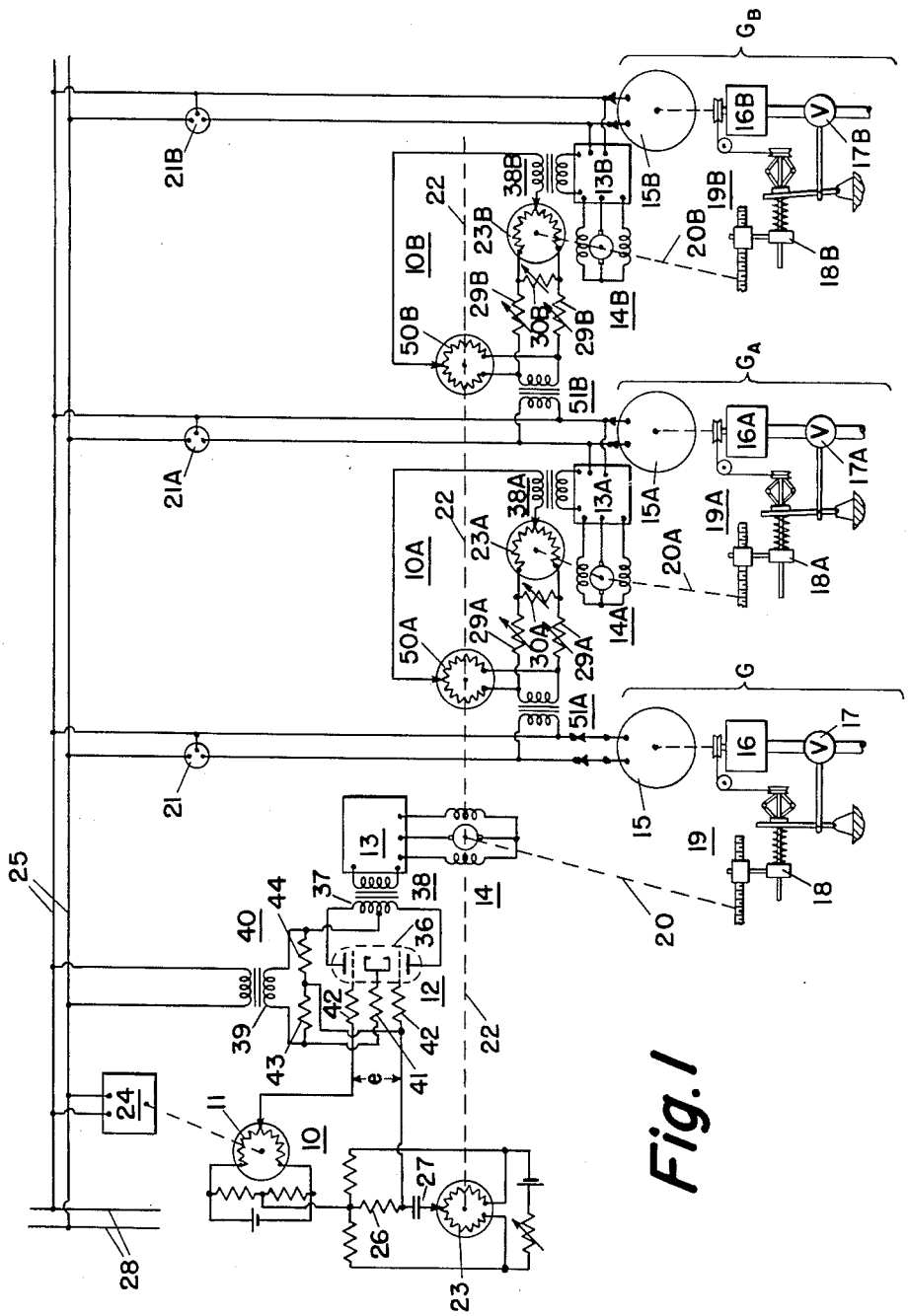

Referring to Fig. 1, the balanceable electrical network 10 located at a generating station serves as the master controller for the generating units of that station. The network 10 includes an impedance or slidewire 11 which is adjusted or positioned in accordance with a variable or primary quantity, such as tie-line load or line-frequency, of the power distribution net in which the generating station is interconnected. The unbalance output voltage "e" of network 10 is amplified by amplifier 13 to energize motor 14 for rotation in sense depending upon the sense of unbalance of network 10. The resulting operation of motor 14 is utilized to rebalance the station controller 10 and concurrently to reset the input-control member 18 of generating unit G which comprises a generator or alternator 15 and its prime mover 16. The latter may be a Diesel engine, a steam, gas or hydraulic turbine whose input is regulated by a valve or gate 17.

In the particular arrangement shown in Fig. 1 to which the invention is not limited, the setting of the input-control member 18 of the valve or gate is controlled by a flyball governor, and the motor 14 through a suitable mechanical connection and reduction gearing, indicated by dotted line 20, changes the compression of the governor spring or other adjustment of the governor linkage, per se known. Therefore, as is well understood by those skilled in the art, for different settings of the governor, the input to the generating unit is changed with ultimate corresponding change of the electrical output of the unit, as indicated, for example, by the wattmeter 21 connected between the generator 15 and the station bus bars 25.

Concurrently with its adjustment of the input-control member of the generator unit G, the motor 14 through a suitable mechanical coupling and reduction gearing, generically represented by broken line 22, effects rebalancing adjustment of an impedance or slidewire 23 in the control network 10. Thus, for any given change in the system variable, the motor 14 operates to effect a predetermined adjustment of the input-control member 18: the coupling 22 and slidewire 23 to the motor forming a feedback loop which substantially immediately rebalances the network in anticipation that the gate or throttle opening corresponding with the motor adjustment will be sufficient to insure return of the tie-line load or line-frequency to the normal desired value. The rebalancing does not wait for the output of the generator unit to attain the magnitude required for such purpose, and there is thus avoided time-lag due to mechanical inertia of the governor and its prime mover, to the thermal inertia of the steam boiler, and to other like factors.

For control of generating unit G in response to changes to tie-line load, the telemetric receiver 24 for positioning the impedance 11 of network 10 is preferably of the type disclosed and claimed in copending application Serial No. 149,612, filed March 14, 1950 and upon which has issued Letters Patent 2,610,311. As more fully explained in the aforesaid application and later herein, upon receiver 24 are impressed signals of frequency varying with the tie-line load at a remote point and transmitted over the system conductors 28, as by carrier, and thence to the receiver 24.

The feedback loop provided makes it possible to include in the station controller reset and rate control actions more fully described and claimed in copending application Serial No. 149,775, filed March 15, 1950, and upon which has issued Letters Patent 2,666,170; however, when the station is but one of a system, these control actions are preferably included, as later described, in the signal received by the telemetric receiver 24 from a system master controller at a load-dispatcher's office.

Reverting to Fig. 1, the balanceable network 10 includes resistor 26 and capacitor 27 for obtaining reset control action in addition to the proportional control action previously described herein. For incorporation of the reset or rate control action, the balanceable network 10 should be of the direct-current type, and, accordingly, in such cases it is necessary to interpose a converter 12 between the network 10 and the alternating current amplifier 13. The converter may be of the vibratory type shown in U. S. Letters Patent 2,113,164, or of type shown in copending application Serial No. 725,465 upon which has issued Letters Patent 2,614,188; or, as shown in Fig. 1, the converter 12 may be of the electronic type having no movable parts. Specifically, the direct-current unbalance voltage "$e$" of network 10 is applied to the control grids of a dual triode 36, or equivalent. The anodes of tube 36 are connected to the terminals of the primary winding 37 of the input transformer 38 of amplifier 13. The center tap of winding 37 is connected to one terminal of the secondary 39 of power transformer 40 and the other terminal of winding 39 is connected to the cathodes of tube 36 through an unbypassed resistor 41 of sufficiently high magnitude to obtain substantial negative feedback. This degenerative feedback eliminates in practical sense any difference between the characteristics of the two triodes, so that when the unbalanced voltage of network 10 is zero, the differential voltage across the two halves of primary winding 37 of transformer 38 is essentially zero.

Due to the large cathode bias provided by resistor 41, it is necessary to provide a positive biasing voltage for the grids which partially overcomes the high negative bias to place each triode section of tube 36 within a satisfactory operating range. This positive voltage is obtained by the voltage drop across resistor 43 of the potential divider 43, 44 which is connected across the plate supply voltage. Specifically, the resistor 43 may be 10,000 ohms and resistor 44 may be 15,000 ohms.

Under condition of balance of network 10, there is no direct-current potential difference between the two grids of tube 36. Furthermore, so far as alternating current is concerned, the two grids are essentially at the same potential because of inclusion of resistor 42 of order of magnitude of 1 megohm in series with each grid. The anodes of tube 36 are concurrently positive for one-half of each cycle of the supply voltage. When the network 10 is balanced, the grids are of the same instantaneous potential throughout the anode potential cycle and the anode current impulses in the primary winding 37 of the signal transformer 38 are equal and opposite. When network 10 is unbalanced and when the anodes are positive, one or the other of the grids is more positive and accordingly the average value of the anode current of one of the triodes is higher than the other depending upon the sense of unbalance of network 10.

In operation, when network 10 is unbalanced in one sense or the other, the signal voltage applied to the amplifier 13 is of phase corresponding with the sense of the unbalance. The direction of rotation of the control motor 14 depends upon the phase of the input signal and therefore the sense in which the input-control member of generator unit G is adjusted depends upon the sense of shange of the tie-line load or other variable.

The amplifier 13 and control motor 14 may be of the type shown in U. S. Letters Patent No. 2,113,164 or in copending application Serial No. 149,614, filed March 14, 1950, and upon which has issued Letters Patent 2,659,850. The particular master controller circuit shown in combination with the amplifier motor arrangement of aforesaid application Serial No. 149,614 provides an overall sensitivity of 0.5%. Greater sensitvity can be secured if required.

In most generating stations, there is more than one generating unit and it is desirable that the changes in load necessary to return the tie-line load or line-frequency to normal be shared among the several units.

To that end, the control motor 14 concurrently with its rebalancing adjustment of slidewire 23 of the control network 10 also repositions the slidewires 50A, 50B of the balanceable control networks 10A, 10B of the other generating units GA, GB. In response to unbalance of unit control network 10A, the control motor 14A of generating unit GA adjusts the input-control member 18A of unit GA and concurrently effects a rebalancing adjustment of the slidewire 23A of network 10A: similarly, the control motor 14B effects rebalancing adjustment of slidewire 23B of unit control network 10B and concurrently repositions the input control member 18B of generating unit GB. Thus, to all practical intents and purposes, the input-control members of all generators G, GA and GB are varied simultaneously in response to change in tie-line load, each to a predetermined position determining the sharing between the station units of the load change which unbalanced the station controller 10.

When the station control network 10 is of type having proportional control action only, the impedance 50A of network 10A, for example, in effect reproduces the pocition of impedance 11 of network 10 for control of the generating unit GA. When, however, the network 10 is of type additionally providing reset and/or rate control action, these same supplemental control effects are produced for the unit GA without need for duplication in network 10A of the impedances required to obtain such supplemental control. Instead, as shown, the balanceable network 10A may be a simple alternating current network, the slidewires 50A and 23A being supplied from an isolating stepdown transformer 51A. The adjustment of slidewire 50A by motor 14 introduces the proportional action and the rate and/or reset control action into network 10A because motor 14 is under control of network 10 which incorporates those control actions. The motor 14 in its rebalancing adjustment of slidewire 23 to position corresponding with the new load demand upon the station also positions slidewire 50A to position corresponding with the new load to be carried by generating unit GA.

The unbalance of network 10A may be impressed, as by input transformer 38A, upon amplifier 13A which is preferably of type described and claimed in aforesaid copending application Serial No. 149,614. The extents to which the generator units G and GA may share the change in load for different given changes in tie-line load may be predetermined by selection of the grading or taper of the slidewires 50A and 23A. Moreover, the load-sharing relationship may be changed, even during operation of the units, by adjustment of series resistors 29A, 29A or shunt resistor 30A of the balanceable network 10A. In like manner, any number of additional generating units of the station may be similarly controlled to follow the changes in setting of the input-control member of the unit G.

Preferably as shown in Fig. 1, the master controller of the station concurrently adjusts the slidewires 50A, 50B of control networks 10A, 10B for generating units GA, GB in response to change in the system variable and the control motors 14A, 14B then respectively quickly adjust the input-control members of units GA, GB to, or approximately to, their ultimate position. The control motors 14A, 14B also concurrently rebalance the networks 10A, 10B by adjustment of slidewires 23A, 23B, the extent of adjustment of each input-control member depending upon the extent of rebalancing adjustment of the corresponding slidewire.

Figure 1C:
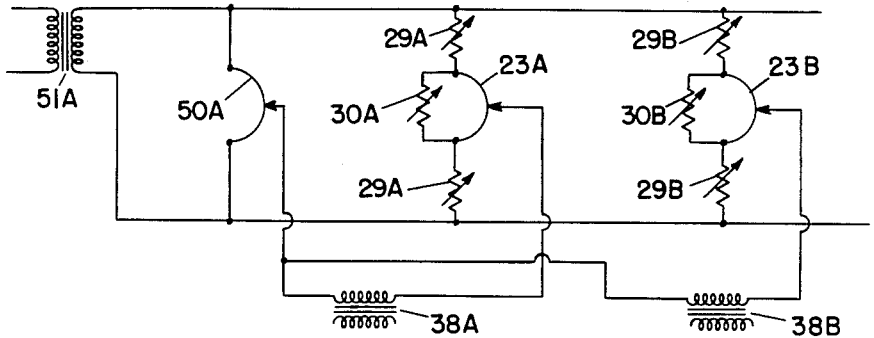

Alternatively, instead of having motor 14 directly coupled to slidewires 50A, 50B by shaft 22 as shown in Fig. 1, each unit G, GA, GB, etc. may serve as the master of the next unit: specifically, the control motor 14A of generating unit GA, in addition to the functions above described, may also adjust the slidewire or impedance 50B of the balanceable network 10B for the next generating unit GB and so on. Thus, as apparent from the preceding description of unit GA, the control motor 14B of the generating unit GB responds to a change in setting of slidewire 50B to reset the input-control member 18B of unit GB and concurrently effects a rebalancing adjustment of the slidewire 23B of network 10B. A modification shown in Fig. 1C permits reduction of the number of components for the unit controls.

With any of these arrangements, upon any change in the controlled variable of the system, such as tie-line load, line-frequency, or the like, all of the input-control members of the generating units promptly and substantially simultaneously move to positions corresponding with the new position of the station-input control slidewire, which positions afford the predetermined desired ultimate sharing of load between the units of the station. The resetting of the input-control members to the new positions is effected without introduction of the time-delays required for response of the individual governors, gate mechanisms, available steam pressure, water head, or the like. The by-passing or elimination of these time-delays permits high-speed repositioning of the input-control members without the hunting or overshooting otherwise occurring.

In the modification shown in Fig. 1A, the change in tie-line load or other primary quantity is converted to a signal at a dispatcher's office, for example, and transmitted over telemetric links L, L₁, L₂, etc. respectively to the stations to be controlled. For the particular arrangement shown in Fig. 1A, this signal for control of a station having generating units G, GA, GB is a voltage which is in phase with a voltage applied to the slidewire 23 and the magnitude of the signal varies with change in tie-line load or other primary quantity. The station control circuit 10 includes a slidewire 50 at the load dispatcher's office and the slidewire 23 at the station: the slidewire 50 under control of a recorder, for example, follows the changes in tie-line load of the system including the station and slidewire 23 at the station is adjusted as now described. The difference between the magnitude of the signal and the effective output voltage of slidewire 23 is the unbalance voltage "e" applied to the synchronous rectifier 12, or equivalent, as an input signal for the amplifier 13 which controls motor 14. As in the system of Fig. 1, the motor 14 adjusts the input control member 18 of generating unit G and concurrently effects rebalancing adjustment of slidewire 23 to reduce the unbalance voltage "e" to zero. Thus, the setting of the governor 19 of unit G upon a change in tie-line load quickly moves to the position which corresponds with the required new load of unit G. Concurrently with adjustment of the input control member 18 of unit G, the motor 14 also adjusts the control slidewires 50A, 50B, etc. of the controlled units of the station. As in the system of Fig. 1, each of the motors 14A, 14B of the other units of the station adjusts the input control member of the corresponding generating unit GA, GB and simultaneously moves a slidewire (23A or 23B) for rebalancing adjustment of the control network (10A or 10B).

In the modification shown in Fig. 1B, the motor 14 is not mechanically coupled to any governor: concurrently with its rebalancing adjustment of slidewire 23, it adjusts the slidewires 50A, 50B, etc., one for each of the corresponding control networks 10A, 10B etc. of the controlled units. Each of these units control networks, as in Fig. 1A, also includes a slidewire which is adjusted by the corresponding motor 14A, 14B to rebalance the control network and simultaneously to change the governor setting of the associated unit.

In event of failure of the telemetric channel to any controlled station, it is provided that its control shall be left in its last adjusted position. In a system such as shown in Fig. 1A, for example, where the control signal is of finite value for all operating conditions, this may be accomplished by a relay 76 energized by the signal voltage or current and whose contacts, upon failure of the telemetric channel, directly or indirectly interrupt the supply circuit of motor 14.

Figure 2:
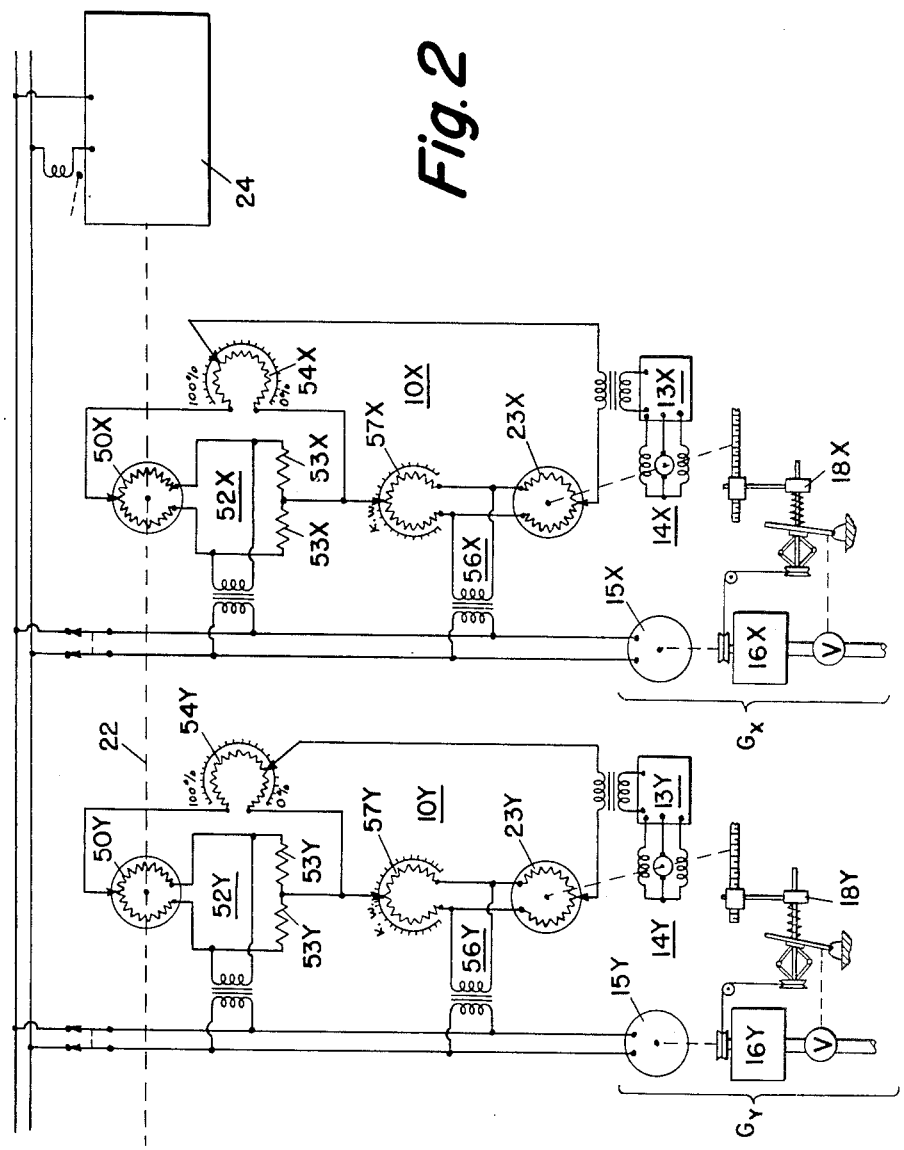

In the modification shown in Fig. 2, a telemetric receiver or repeater 24 positions the control slidewires 50X, 50Y, etc., corresponding in number to the generating units of the station to be controlled, in accordance with a signal representative of the load demand to be met by the station under existing conditions of tie-line load, system frequency or other variable. Such signal may originate at a system load-dispatcher's office. The follower network 10X for controlling the generating unit GX comprises two networks 52X and 56X effectively in series in the input circuit of the amplifier 13X for the synchronizing or control motor 14X of the generating unit GX. More specifically, the slidewire 50X adjusted by the repeater forms two arms of the bridge network 52X whose other two arms are formed by the resistors 53X, 53X. This bridge is preferably of low impedance. A high impedance slidewire 54X connected between the relatively movable contact of slidewire 50X and the common terminal of resistors 53X, 53X is traversed by the unbalance current of the bridge 52X. The movable contact of slidewire 54X can be set manually so that any desired percentage of the total potential drop across slidewire 54X can be selected for opposition to the unbalance of the network 56X. The setting of slidewire 54X predetermines the proportionate extent to which generating unit GX shares in re-distribution of load among the station-generating units.

The second bridge network 56X of the control network 10X comprises the motor-driven rebalancing slidewire 23X and a manually adjustable slidewire 57X which can be adjusted to preset the "maneuvering point" of the generating unit GX.

Each of the additional generating units GY etc. of the station may be provided with a similar control arrangement. For example, the control for unit GY includes the slidewire 50Y positioned by the repeater or station controller 24 and a slidewire 23Y adjusted by the control motor 14Y concurrently with change in setting of the input control member 18Y of the unit.

The settings of the slidewires 54X, 54Y, etc. should preferably add up to 100 per cent. If any one or more of the units of a station are not to share in tie-line load control, it may be put on base load simply by adjustment of the contact of percentage slidewire 54 of that unit to zero, and setting its slidewire 57 to correspond with the desired fixed base load.

The displacement of the unit control slidewires 50X, 50Y etc. from a schedule position corresponds with the amount by which the station load should be changed to correct for the deviation in tie-line load. The proportional extent to which the units of a station participate in the tie-line load change can be varied by the station operator by readjustment of the settings of the movable contacts of slidewires 54X, 54Y, etc.

The generating units of the station may be of substantially different operating characteristics and load capacities; the provision of the "maneuvering point" slidewires 57X, 57Y permits the operator to preset a suitable maneuvering point for each machine and the percentage slidewires 54X, 54Y permit him to preset the extent to which the individual machines of the station shall participate in supplying the tie-line load demand upon the station.

As in the previously described arrangements, the input-control member of each of the controlled units of the station immediately moves in response to the change in the tie-line load or other system variable in sense and to extent determined by the station controller and the resetting of the input-control members of the units to their new positions is characterized by absence of time-lag of the components of the unit or of its supply source.

Figure 3:
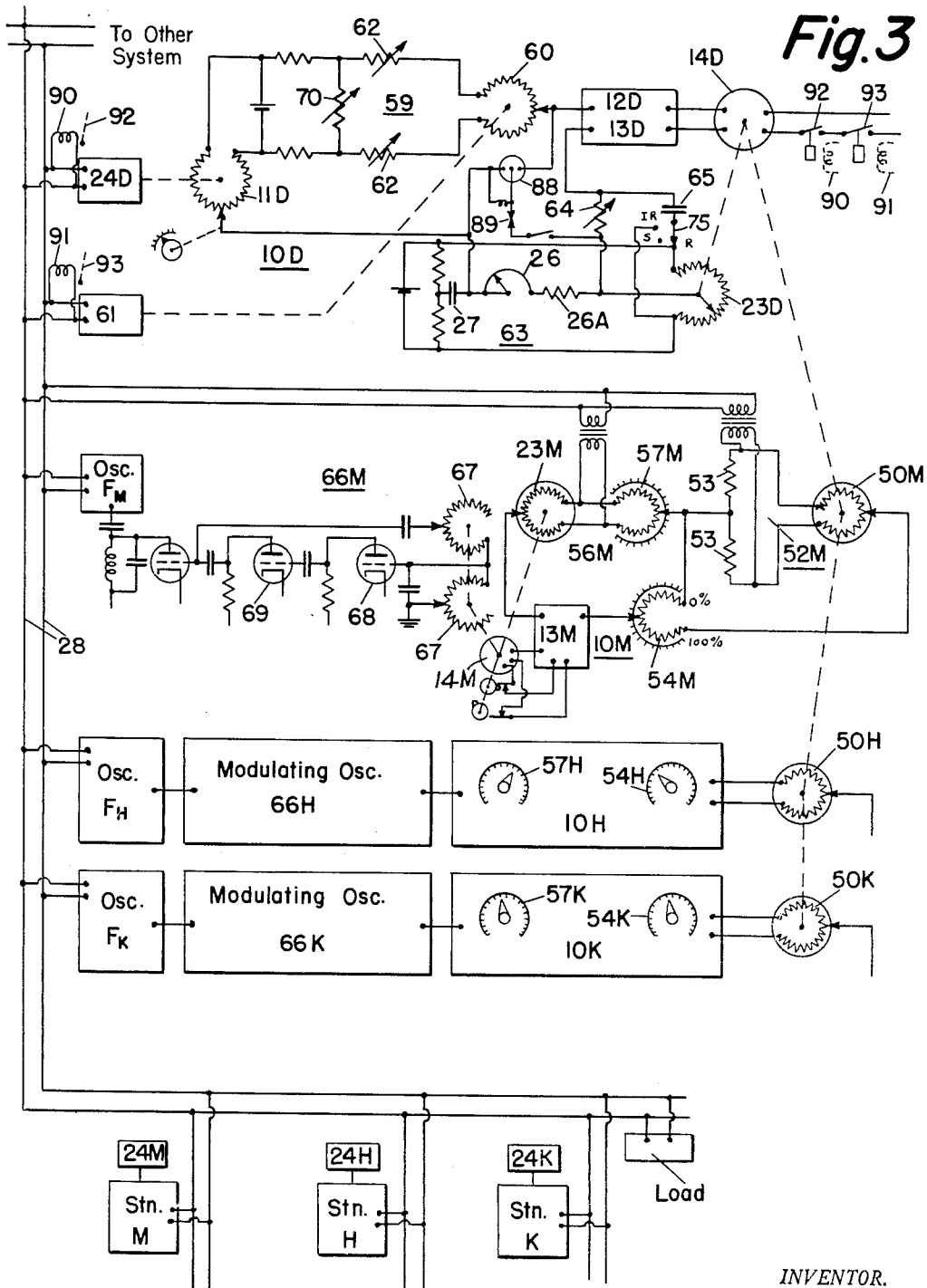

The immediate resetting of the input-control members of a plurality of generating units in response to a master controller may be effected whether the units are in the same station as in preceding figures or in different stations as in Fig. 3 now to be described. Specifically, it will be assumed the master controller is at a load-dispatcher's office remote from the generating stations and from the point of measurement of their tie-line load.

Referring to Fig. 3, the slidewire 11D is adjusted, as by a telemetric receiver or tie-line load recorder 24D, to positions corresponding with the deviations of the tie-line power or load from or to a system exemplified by generating stations H, K and M, each having one or more controlled generating units. The slidewire 11D is included in a bridge network 59 including an adjustable slidewire 60 which may be positioned by the system frequency recorder 61 to afford a frequency-bias to the tie-line load control. The series-rheostats 62, 62 are provided to shift the position of balance of the slidewire 60 for any given setting of slidewire 11D and the shunt rheostat 70 provides for adjustment of the effective range of slidewire 60. As later discussed, the adjustment of rheostat 70 varies the slope of the tie-line load/frequency characteristic of the entire system regulated by the master controller and the adjustment of rheostat 62, 62 shifts the intercept of that characteristic with a predetermined frequency so to predetermine the power interchange at that frequency between that system and the net comprising it and other generating systems.

Assuming the tie-line load increases or decreases from the scheduled value, the unbalance output voltage of the composite network 10D is applied to the converter-amplifier 12D—13D to produce rotation of motor 14D in proper sense for a rebalancing adjustment of slidewire 23D. Concurrently with the rebalancing adjustment of slidewire 23D, the motor 14D of the dispatcher-controller effects a corresponding adjustment of the "station" slidewires 50M, 50H and 50K in number corresponding with the controlled stations of the system. The slidewire 23D may be included in control network 63 of type having a resistor 26 and capacitor 27 providing reset control action. This same network may also include a rheostat 64 and capacitor 65 which provide a "rate" control action: a three-position switch 75 permits disabling of the rate control action or selection of either "rate" control action or "inverse rate" control action. For more specific discussion of these control actions, reference may be had to aforesaid copending application, Serial No. 149,775.

Cancellation of the reset action when the potential difference between the contacts of the slidewires 11D and 60 is zero may be effected by a contact galvanometer 88 whose coil is connected between said slidewire contacts and whose contacts 89, closed for zero energization of the galvanometer, are in a circuit shunting the reset resistors 26, 26A. In the pneumatic controller of Fig. 4, cancellation of the reset action is effected when switch 95 energizes the solenoid of the solenoid-actuated valve 94.

Upon change in tie-line load, each of the station control slidewires 50M, 50H and 50K is therefore promptly moved to a position corresponding with the tie-line load deviation and thereafter moves in unison in accordance with the reset and rate control action provided by the network 63. As hereinafter more fully explained, the change in position of each of the slidewires 50M, 50H and 50K results in transmission to each of the corresponding stations M, H and K, remote from the dispatcher's office, a signal which automatically predetermines the extent to which each station shall participate in returning the tie-line load to normal.

In event of failure of primary intelligence to the frequency recorder 61 or to the tie-line load telemetric receiver 24D, the station slidewires 50M, 50H, 50K are left in their last adjusted positions. This freezing or locking of the master controller may be effected by breaking the supply circuit of motor 14D in response to such failure: specifically, the relays 90, 91, respectively in circuit with the frequency recorder and telemetric receiver, control the contacts 92, 93 in the supply circuit of motor 14D.

As the electromechanical linkages from the station slidewires 50M, 50H, 50K may be similar, only one of them is specifically described, the remainder being indicated by appropriately labeled blocks. The network 10M for tie-line load control of station M from the system load-dispatcher's office includes a slidewire 54M manually adjustable to predetermine the percentage of the total unbalance of network 52M which is opposed to the unbalance voltage of the network 56M. Thus, the setting of slidewire 54M predetermines the extent to which station M shares in the redistribution of load required to correct for a deviation in system tie-line load. The network 56M includes a slidewire 57M manually adjustable by the load dispatcher to predetermine a "maneuvering point" of station M which is suited for its connected generating capacity, local load and like factors. Network 56M also includes a slidewire 23M adjusted by the motor 14M to rebalance the network 10M to obtain null input to the amplifier 13M. Assuming slidewire 54M is not set at zero, the setting of slidewire 23M at any time thus corresponds with the tie-line load demand to be met by station M for the then existing conditions of frequency and tie-line load. That intelligence is transmitted to a controller at station M by a telemetric arrangement now described.

Concurrently with its rebalancing adjustment of slide-wire 23M, the motor 14M correspondingly shifts the frequency of a low-frequency oscillator 66M so to vary the modulating frequency applied to carrier-frequency oscillator $F_M$ whose output may be applied to the tie-line 28 or otherwise transmitted to station M. At station M, the carrier is demodulated so that the modulating frequency corresponding with the station requirements for existing tie-line load deviation may be utilized by the frequency-recorder receiver 24M of station M to effect corresponding change in position of the input control members of its generators generally as previously herein discussed. The master controller of station M therefore becomes a follower of the master dispatcher-controller 10D and the station controller 10M.

In the particular form shown in Fig. 3, the modulating oscillator 66M is of known resistance-capacity type in which the frequency of the generated oscillations may be changed by variation of resistance or capacity in the oscillator circuit. Specifically in Fig. 3, the two frequency-determining resistors 67, 67, disposed respectively in the input circuit of tube 68 and in the feedback circuit between the tubes 68 and 69, are simultaneously adjusted by the motor 14M to provide a modulating frequency corresponding with the setting of slidewire 23M of control network 10M. By way of example, the range of frequency of oscillators 66M, 66H and 66K may be from 80 to 100 cycles.

The carrier frequencies of the three oscillators $F_M$, $F_H$ and $F_K$ are, of course, suitably different so that each of the stations M, H and K receives only the information applicable to it. Each telemetric receiver includes means, not shown, for selecting the proper carrier and demodulating it: each station receiver and associated controller serves as a repeater for the corresponding controller-transmitter at the dispatcher's office or station.

For a given deviation of tie-line load, the modulating frequencies applied to the corresponding carrier-frequency oscillators $F_M$, $F_H$ and $F_K$ depends upon the settings of the maneuvering point slidewires 57M, 57H and 57K and upon the settings of the percentage slidewires 54M, 54H and 54K. Thus, upon any change in tie-line load or power-line frequency, the input-control members of all the generating units of the stations M, H, K etc. of the system are immediately moved to predetermined positions and all are subjected to the control law established by the system dispatcher's master control network 10D.

Although in the system of Fig. 3 three stations are shown connected to the tie-line 28, it shall be understood that the number may be smaller or greater, usually the latter. With the system of Fig. 3, the load dispatcher may adjust any one or more of the percentage slidewires 54M, 54H, etc. to vary the sharing of tie-line load between the stations; or he may put one or more of stations on fixed base load by setting its percentage slidewire to zero and then readjusting the position of the remaining percentage slidewires 54M, 54H, 54K etc. to predetermine the extents to which the remaining stations of the system shall participate in sharing the tie-line load deviations. In generally like manner, a supervisor at each of the stations M, H, K etc. can, as previously herein mentioned, place any of the units in his station on base load and select the extent to which the remaining generating units of the station shall participate in the sharing of load called for by the corresponding station controller at the load-dispatcher's office. Such flexibility is helpful in meeting the contingencies that occur in actual operation, such, for example, as the power available at the individual stations, the local load demands upon individual stations, breakdowns, and other emergency conditions.

Thus in operation of a net of interconnected systems, when there arises any condition which affects the interchange of power over the tie lines, the input-control members of the individual generating units are promptly repositioned to predetermined settings, each in accordance with the master controller of its station, which was promptly reset in accordance with the new setting of a master controller at the system dispatcher's office. There is thus effected that coordination of control of every generating unit contributing to the tie-line load which is required for smooth regulation of interconnected systems of a net.

Figure 4:
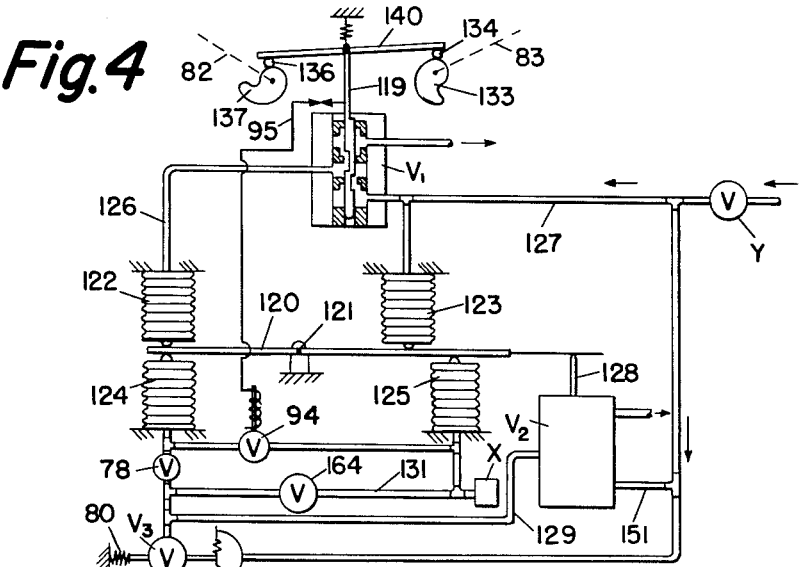
Fig. 4A is a modification of part of Fig. 4.
Fig. 4B is in part a modification of Fig. 4 for an all-pneumatic controller.
Fig. 4C is a modification of Fig. 4 using an electro-mechanical link in substitution for a mechanical linkage.

In Figs. 1 to 3, the master controller for positioning the station or unit slidewires is of electromechanical type using balanced electrical networks and, as described, may provide proportional, rate and reset control: in Fig. 4, the master controller is of balanced pneumatic type, such as more fully described in Stein et al. Patent 2,285,540, modified to position the station or unit slidewires and to afford proportional, rate and reset control actions.

Specifically referring to Fig. 4, the cam 133 may be positioned by a recorder responsive to tie-line load and the cam 137 may be positioned by a frequency-recorder such as shown in Wunsch Patent 1,751,538 or in aforesaid copending application Serial No. 149,612. The two cams respectively engage cam followers 134 and 136 carried by a common support 140 engaging or pivotally mounted on the stem of valve member 119 of valve $V_1$. The valve member 119 controls the pressure in a bellows 122, or equivalent, by regulating the bleeding to atmosphere of air or other fluid supplied to the valve $V_1$ from the supply line 127. The expansion or contraction of the bellows 122 in response to such pressure changes is communicated through lever 120 to the movable member 128 of a second valve $V_2$ generally similar in construction to valve $V_1$. The change in position of valve member 128 controls the pressure in chamber 132 of pneumatic motor 81 by regulating the rate at which there is bled to atmosphere fluid supplied by line 151 to the valve $V_2$ and to chamber 132 of the motor. The movement of the diaphragm 101 of motor 81 is communicated by a link member 22A to the movable elements of the station slidewires 50M, 50H, 50K, or the unit slidewires 50A, 50B, 50C. Thus, immediately upon change in tie-line load or other primary quantity, the station or unit control slidewires begin to move to a new predetermined position. The proportional control action is afforded by bellows 124 acting in opposition to bellows 122 and connected to the same pressure line 129 as chamber 132. The reset control action is afforded by the bellows 125 which acts upon the lever 120 in opposition to bellows 124 and in the same sense as bellows 122. Bellows 125 is in communication with bellows 124 through a valve or equivalent constriction 164 which may be adjustable. The capacity of bellows 125, supplemented when necessary by that of a storage tank X, is the pneumatic equivalent of an electrical capacitor, the constriction 164 is the pneumatic equivalent of an electrical resistor, and the time constant of two determines the rate of operation of the reset action. The primary purpose of fourth bellows 23 is to compensate for fluctuation of pressure in the supply lines 127 and 151 not completely eliminated by the pressure regulator Y. Rate action control is provided by the valve or constriction 78 interposed between the chamber 124 and the line 129. To preclude adjustment of the station or unit slidewires in event of failure of the master controller, a shut-off valve $V_3$ is interposed between the line 129 and the chamber 132. The valve is biased toward closed position, as by spring 80, but is held open so long as the controller is operative, as by a motor 79. To freeze the control upon failure of the air supply to the pneumatic controller, the motor 79 is a pressure-responsive device connected to the air supply line. An equivalent electrical arrangement may be used to shut the valve V₃ upon failure of the primary quantity or quantities being measured or upon failure of the measuring apparatus which positions cams 133, 137 of the controller.

In the pneumatic controller of Fig. 4, the slope of the load/frequency characteristic may be adjusted by changing one or both cams or by changing the point of attachment of lever 140 to the valve member 119: the intercept of the characteristic with base frequency may be varied by shifting either cam angularly on its shaft.

Figure 4A:
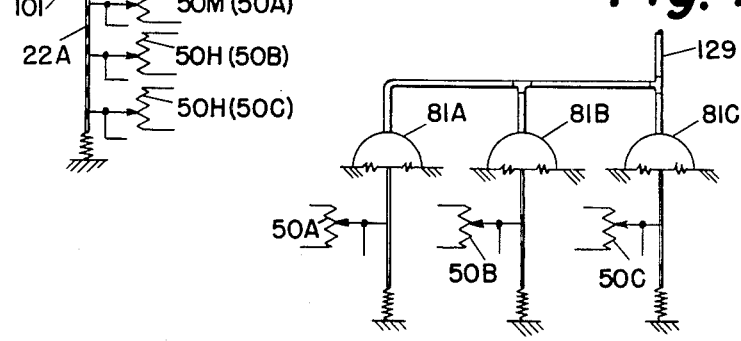
Figure 4B:
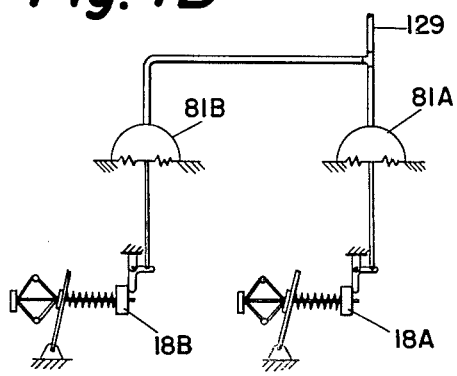

In the arrangement of Fig. 4, a single pneumatic motor 81 is used to position all of the station or unit slidewires: alternatively, the slidewires may be, as in Fig. 4A, individually coupled to corresponding pneumatic motors 81A, 81B, 81C, pneumatically connected to the output line 129 of valve V₂. In the arrangement of Figs. 4 and 4A, the slidewires may be individually disposed in control networks 10A, 10B, etc. of Fig. 1 or control networks 10M, 10H, 10K of Fig. 3. In the modification shown in Fig. 4B, such control networks are omitted and the pneumatic motors 81A, 81B, etc. are directly coupled to the input control members 18A, 18B of the corresponding generating units.

Figure 4C:
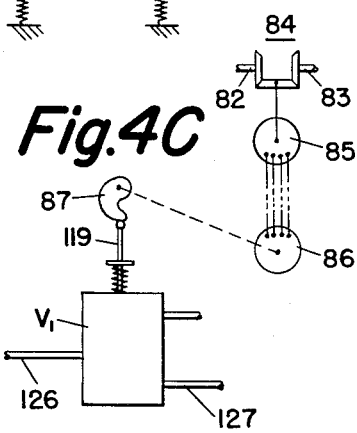

In the arrangement shown in Fig. 4, it is necessary that the pneumatic controller be in proximity to the frequency and tie-line load recorders. When it is desirable or necessary that the pneumatic system be remote from such primary responsive elements, their shafts 82 and 83 may be coupled by the differential gearing 84 to a Selsyn transmitter 85 or equivalent (Fig. 4C). The position of the rotor of the Selsyn 85 is electrically transmitted to the Selsyn receiver 86, or equivalent, so that its rotor assumes a position determined jointly by the angular positions of the shafts 82 and 83, with the result that the position of valve member 119 as varied by cam 87, or equivalent, continuously corresponds with the then existing relation between tie-line load and frequency.

In Fig. 5, the master controller for setting the station control slidewires 50M, 50H, 50K at a dispatcher's office, or the unit control slidewires 50A, 50B, 50C at a generating station is a modification of a control system shown in Davis Patent 2,300,537. In this modification, the slidewires 11D and 60, 60 are respectively positioned by load and frequency controllers to produce an unbalance detected by relay 13R. The motor 14 is controlled by the relay to adjust the rebalancing slidewire 23 in sense and to extent to rebalance the network including 11D, 60, 60 and 23 and concurrently to position the station or unit control slidewires 50M et seq. or 50A et seq. Reset control action is provided by including in that network the slidewires 229, 230 which are coupled to motor M₁. This motor is under control of relay R₁ which is responsive to unbalance of a second network including the slidewires 11D, 60, 60 and temperature-sensitive resistors 237, 238. The heaters 239, 242, respectively in heat-transfer relation to resistors 237, 238 are selectively energized, concurrently with reversible motor M₁, by relay R₁.

The slope of the tie-line load/frequency characteristic of the component system controlled by this master controller can be varied by resetting the rheostat 70 in shunt to the slidewire 11D and the power-interchange between that system and the net at a given frequency can be varied by resetting the position of the contact of slidewire 11D. Thus, the system load-dispatcher by adjusting two knobs of the master-controller can meet his tie-line schedule and assist in maintenance of frequency in proportion to the connected generating capacity of his system.

With the addition of more and more power systems to existing nets, the control of exchange of power between individual systems and the net presents a problem of increasing difficulty and complexity. Manual regulation of the generation in the individual stations of a system, either from station instruments or upon orders from a system load-dispatcher's office, to meet the varying local load and also to maintain the scheduled tie-line load exchange with the net has proved most arduous; furthermore, full benefit of the interconnection has not been realized because of the personal equation involved and because of the practical impossibility of coordinating the timing and sequence of manual regulating efforts in the many and widely separated stations of a net.

In application of the invention to operation of a net, the use of master controllers for the individual systems affords utmost flexibility and provides the coordinated regulation essential to smooth regulation. In some nets, the regulation of net frequency is assigned to one system in a given area and other systems hold their tie-line loads toward this area. In such case, the master controller of the system assigned to hold net frequency responds only to frequency-changes: for such operation with the master controller of Fig. 3, for example, the mechanism or circuits for effecting variation of slidewire 11D of control network 59 with load changes is disabled and the slidewire 11D set in position corresponding with zero interchange. When a small system is interconnected with a large system to which the task of maintaining net frequency is assigned, a substantially fixed tie-line load would ordinarily be maintained on the smaller system. In such case, assuming the master controller for the smaller system is of type shown in Fig. 3, the mechanism or circuits for effecting variation of slidewire 60 of control network 59 with variation of frequency is disabled and the slidewire 60 set in position corresponding with normal frequency. The smaller system then operates on flat tie-line load control.

However, the aforesaid type of control is not well suited for control between two interconnected systems of comparable connected capacity or for a complex net since a principal reason for the interconnections is to permit transfer of excess generating capacity in one area to another area which at that time, for one reason or another, is deficient in generating capacity. Fixed tie-line load control is not well suited in such situations because with tie-line load rigidly held at a certain value, the load swings must be absorbed in the area of their origin and the regulating burden on the frequency-controlling station or system may be unduly increased because correction for tie-line loading may oppose the trend of instantaneous frequency at a particular time.

In nets having ample generating and tie-line capacity, it is not necessary to assign regulation of frequency to any particular system or station. By providing systems of a net with master controllers which are properly set for frequency-biased tie-line load control, each system not only maintains its scheduled tie-line load but contributes to close maintenance of normal frequency, in proportion to its connected generating capacity.

The following discussion is in explanation of how these objectives are obtained.

The inherent frequency regulation of an isolated generating system with its local connected load can be determined by disconnecting from the load a small known fraction of the generating capacity being used and noting the resulting drop in frequency which usually for 60-cycle systems is about 0.1 cycle for 1% decrease in connected generating capacity.

It is now first assumed the two generating systems A and B, Fig. 6, of like generating capacities and inherent regulating characteristics are operating, disconnected from one another, at the same frequency and in synchronism. If under those conditions, a tie-line connection is completed between the stations, there is no interchange of power over the tie line. Again assuming the original conditions of disconnection, if additional load is connected to system B, the frequency would fall by an amount dependent upon the added load and the frequency-load characteristic. However, if such additional load is connected to system B while interconnected with system A by the tie-line, there is flow of power from system A over the tie-line, which tie-line power supplies a substantial part of the additional load of system B and with correspondingly smaller frequency drop. If, on the other hand, the additional load is connected to system A, the system B would supply a substantial part of the added load over the tie-line, the direction of flow of tie-line power reversing in direction always to flow toward the system having the greater load.

When the two interconnected systems are not of equal capacities, the division of added load between them is roughly in proportion to their connected generating capacities.

In accordance with the present invention, the inherent sharing of load changes between interconnected systems is not opposed by the tie-line load control. To that end, the frequency-bias rheostat 70 of the master controller of Fig. 3, for example, is set to correspond with the relation between the inherent regulation characteristic of the net and its connected generating capacity and the contact of slidewire 11D is set to correspond with the scheduled tie-line load of the system. Each system will absorb local load changes in its own area and during the required shifting of its generation will receive over the tie-line temporary assistance from the other systems. When there are more than two interconnecting systems so controlled, upon increase of local load upon any one of them, there is flow of power to it over the interconnections from other systems, each contributing in proportion to its connected generating capacity. Each master controller recognizes whether or not a deviation is due to load change in its area or some other area and the only changes in generation called for by the master controller are in sense to bring its area back to its bias curve and so maintain the scheduled tie-line load.

The operating characteristic of a system having tie-line load bias control may be represented by solid line $b$—$b$ of Fig. 7, the point X representing the scheduled interchange $T_N$ at normal frequency $F_N$. If the frequency should suddenly fall to $F_S$, the operating point temporarily shifts to Y, the distance $T_N$ to $T_S$ representing the amount the interchange deviates from schedule to supply power to the area in which added load caused the line-frequency to drop. However, the master-controller effects prompt repositioning of all generating units of the system in sense and to extend which should restore the tie-line load to scheduled value if the system subjected to the added local load has connected generating capacity to supply it. If it has not, the tie-line load schedule may nevertheless be maintained, as now described, by slight change of the frequency at which the master controller is in balance for the desired tie-line load.

The effect of resetting the normally fixed contact 11D of Fig. 3, for example, is to raise or lower the regulating characteristic $b$—$b$ parallel to itself. If it is lowered to the dotted position $b'$—$b'$, the tie-line schedule is maintained at the slightly lower frequency $F_S$: preferably, however, the rheostats 62, 62 of the master controllers are complementarily adjusted so that the slightly lower frequency, which is temporarily the new base frequency for the net, maintains the scheduled tie-line load of each system at the value indicated by the calibrated contact setter for slidewire 11D of the master controller of that system.

When the tie-line load schedule requires increased tie-line load at normal frequency $F_N$, the slidewire contact is moved in reverse direction to raise line $b$—$b$ parallel to itself as to the broken line position $b''$—$b''$ which as indicated raises the interchange at frequency $F_N$ to the higher tie-line load value $T_{N_1}$. If the frequency should fall to $F_S$, the temporary deviation of tie-line load is the same as before as indicated by equality of the distances $T_{N_1}$—$T_{S_1}$ and $T_N$—$T_S$. In brief, the contribution of the system in response to changes in load elsewhere in the net is not affected by the changed tie-line schedule.

As the connected generating capacity of a system varies from time to time for many reasons, it should be possible to vary the extent of its contribution to load changes of the net without upsetting the scheduled tie-line load. This is accomplished in Fig. 3, for example, by adjustment of rheostat 70 so that the frequency/tie-line load characteristic $b$—$b$ is in effect rotated about its intercept with the normal frequency axis to a position such as indicated by line $b'''$—$b'''$ for which upon fall of frequency to $F_S$, the system, as indicated by the smaller distance $T_N$—$T_{N_3}$, contributes to smaller extent to the net for added load in other areas.

From the foregoing it should be appreciated that if all areas are operating on tie-line load bias control, each with its bias properly set, it is unnecessary to assign the task of frequency-regulation to any one system or station. If the load changes in any system of the net, that system is no longer operating on its bias curve and its control then operates to vary its generation. In the meantime, the other systems of the net in proportion to their connected generating capacities momentarily help supply this additional load and their controls do not make generation changes which would later require recorrecting. With ample generating capacity in the net, system frequency is closely maintained.

While the foregoing for simplicity of explanation concerns only a single tie-line, it is generally applicable to complex nets in which individual systems may have many tie-lines associated with it. In such case, the algebraic sum of tie-line loads of the system becomes the primary quantity for positioning of the slidewire 11D or equivalent of the master controller of that system.

In Fig. 8, there is shown part of a typical power net in which the stations $A_1$, $A_2$, $A_3$ are comprised in system A connected by tie-line 28A to system B comprising stations $B_1$, $B_2$. System B may be connected by tie-line 28B to system C not shown. Each system has its own local loads represented generically by labeled blocks whose demands are not measured by the recorders or like devices 24A, 24AB, 24BC which supply tie-line load information to the system master controllers which may be of any of the types herein described or their equivalent.

The primary intelligence received by the master controller of system A is promptly converted, in manner previously described, to signals transmitted to the station controllers of system A which in turn effect prompt resetting of the input-control members of the generating units G of that station. Thus, upon deviation from the balance point of that controller as determined by its tie-line load and normal frequency settings, the input-control member of every controlled generating unit of system A promptly moves to a corresponding setting.

Since system B has two tie-line connections, its master controller is actuated in response to the algebraic summation of the responses of the tie-line load responsive devices 24AB and 24BC which may be thermal-converters connected in opposition to a recorder actuating the slidewire 11D (Fig. 3) of the master controller. The primary intelligence received by master controller B is promptly converted, in manner previously described, to signals transmitted to the station controllers $B_1$, $B_2$ which in turn effect prompt resetting of the input-control members of the generating units of the stations, each to a setting corresponding with the order of system master controller B. It should be noted that the frequency-bias setting for system master controller B should be on the basis of its own connected generating capacity.

From the foregoing explanation and discussion of specific arrangements embodying the invention, other generically similar arrangements for effecting coordinated control of the systems, stations and individual generating units of power-distribution nets will suggest themselves to those skilled in the art, and it is to be understood

What is claimed is:

1. A control system for generators supplying electric power to a distribution system comprising a master network unbalanced in accordance with the sense and extent of deviations of a variable of said system from a predetermined magnitude thereof, a master motor responsive to unbalance of said network to effect rebalancing adjustment of an impedance thereof, balanceable follower networks each including an unbalancing impedance adjusted concurrently with rebalancing of said master network, control members respectively adjustable to vary the inputs to the prime movers of the corresponding generators, follower motors respectively responsive to unbalance of said follower networks for adjusting the corresponding input control members, and balancing impedances respectively included in said follower networks and adjusted by the follower motors to rebalance the corresponding follower network whereby all of said input control members upon occurrence of a deviation of said variable promptly move each to a predetermined position corresponding with the rebalance adjustment of said master network.

2. A control system as in claim 1 in which the follower networks include impedances manually preset to predetermine the percentage distribution, among the generators of a station, of load changes demanded by deviations of the system variable.

3. A control system as in claim 1 in which the follower networks include impedances preset to determine the individual loads of the generators at normal magnitude of the system variable.

4. A control system as in claim 1 in which the follower networks each include impedances preset respectively to fix the load of the corresponding generator for null deviation of the system variable and to predetermine the percentage of the station load change to be assumed by that generator upon deviation from normal of the system variable.

5. A control system for generating stations having one or more generators supplying electric power to a distribution system comprising a master network unbalanced in accordance with tie-line load deviations, a master motor responsive to unbalance of said network to effect rebalance thereof, balanceable follower networks in number corresponding with said stations and each including a follower impedance adjusted concurrently with rebalancing of said master network, follower motors respectively responsive to unbalance of said follower networks to effect rebalance thereof, and oscillators for transmitting deviation information to said stations each including impedance means respectively adjusted by said follower motors in rebalancing of said follower networks.

6. A control system as in claim 5 in which the follower networks include impedances respectively preset to predetermine the oscillator frequencies corresponding with null deviation of the tie-line load.

7. A control system as in claim 5 in which the follower networks include impedances preset to predetermine the relative extents of shift of the oscillator frequencies for given deviations of tie-line load.

8. A control system for establishing predetermined relations between the respective input-control members of prime movers of alternators supplying power to a common distribution system comprising balanceable networks in number corresponding with the alternators and each including two impedances, a plurality of motors each responsive to unbalance of a corresponding one of said networks to effect adjustment of the corresponding input-control member and concurrently to effect rebalancing adjustment of one of said impedances of that network, means for coupling all but one of the remainder of said impedances each to an input-control member different from that of the other impedance in the same balanceable network, and means for adjusting said one of the remainder of said impedances in accordance with a system variable.

9. A control system for regulating the sharing of load between generating units, one of which serves as a master, comprising a balanceable direct-current network including two impedances, one of which is varied in accordance with a variable of the distribution system to which said units are connected, a motor responsive to unbalance of said network for effecting rebalancing adjustment of the other of said impedances and concurrently to adjust the input-control member of the master unit, a balanceable alternating-current network including two impedances one of which is mechanically coupled to said input-control member of the master generating unit, and a motor responsive to unbalance of said alternating-current network for effecting rebalancing adjustment of the other impedance thereof and for concurrently effecting adjustment of the input-control member of another of said generating units.

10. A control system as in claim 9 in which the input-control element of each of additional generator units is similarly adjusted by a motor responsive to unbalance of an alternating-current network including two impedances respectively mechanically coupled to the input-control element of that unit and to the input-control element of another unit.

11. A control arrangement for an alternating-current generating system having at least one tie-line connection and at least one controlled station having at least one controlled generating unit, a self-balancing master controller, controller elements respectively adjusted in response to changes of frequency and of tie-line load and unbalancing said controller for concurrent values of frequency and tie-line load which deviate from the tie-line load/frequency characteristic of the controller, means adjustable to vary the slope of said characteristic, means adjustable to vary the intercept of said characteristic, said two adjustable means providing for matching of said controller characteristic with the inherent regulation characteristic of the connected generating capacity of said system, and means controlled by said master controller for resetting the input-control member of each controlled generating unit of said system in accordance with the sense and extent of the self-balancing action of said master controller.

12. A control arrangement as in claim 11 in which the last-named means thereof comprises a station controller for each controlled station of the system and which is unbalanced by self-balancing action of the system master controller, and means for rebalancing each station controller and resetting the input control member of at least one generating unit of that station.

13. A control arrangement as in claim 11 in which the last-named means includes a telemetric link to each controlled station of the system for transmission thereto of a signal corresponding with the rebalancing action of the system master controller, a station controller at each of said stations unbalanced in accordance with the signal from the corresponding telemetric link, a unit controller for each controlled unit of the station, means for rebalancing each station controller and concurrently unbalancing the unit controller for each controlled unit of the station, and means for rebalancing each of said unit controllers and concurrently resetting the input-control member of the corresponding generating unit.

14. A control arrangement for a system load-dispatcher's office comprising balanceable networks in number corresponding with controlled generating stations of the system, means at the load-dispatcher's office for concurrently unbalancing said networks in sense and extent corresponding with deviation from a predetermined load-frequency characteristic, adjustable impedances in the respective networks, each preset to determine the load of the corresponding station for null deviation of said characteristic, adjustable impedances in the respective networks, each preset in accordance with the proportion of system load changes to be carried by the corresponding station, a telemetric link for each of the stations including an adjustable impedance, and means for rebalancing each of said networks for concurrent control of the respective stations for coordinated proportional sharing of the load changes.

15. A control arrangement as in claim 14 in which the adjustable impedance of each link is at the corresponding station and adjusted for rebalancing of the associated network concurrently with resetting of input-control members of generating units of the station.

16. A control arrangement as in claim 14 in which the adjustable impedance of each link is at the dispatcher's office and is automatically adjusted during rebalancing of the associated network to effect variation of a control signal transmitted by the link to the corresponding station.

17. A control system for generating units of a station supplying electric power to a distribution system, a station controller unbalanced in accordance with the sense and extent of deviations of a variable of said system from a predetermined magnitude thereof, motive means responsive to unbalance of said station controller to effect rebalance thereof at the existing deviation, balanceable unit networks each including a unit impedance adjusted concurrently with rebalancing of said station controller, control members respectively adjustable to vary the inputs to the prime movers of said generating units, unit motors respectively responding to unbalance of said unit networks for respectively adjusting the corresponding input control members, and impedances respectively included in said unit networks and adjusted by said unit motors to rebalance the corresponding unit networks.

18. A control system as in claim 17 in which each unit network includes an impedance preset to determine the load of the corresponding generating unit for null deviation of the system variable.

19. A control system as in claim 17 in which the unit networks include impedances preset to predetermine the percentage distribution among the generating units of the station load changes corresponding with different deviations of the system variable.

20. A control system for generating stations having one or more generating units supplying electric power to a power system comprising a master controller unbalanced by deviation from a predetermined tie-line load/frequency characteristic, a master motor responsive to unbalance of said controller to effect rebalance thereof at the existing deviation, balanceable station networks in number corresponding with said stations and each including a station impedance adjusted concurrently with rebalancing of said master network, station motors respectively responsive to unbalance of said station networks to effect rebalance thereof, and telemetering channels for transmitting deviation information to said stations each including impedance means respectively adjusted by said station motors in rebalancing of said station networks correspondingly to vary the telemetric information.

21. A control system as in claim 20 in which the station networks include impedances varied to provide a varying telemetering frequency corresponding with the station load to be assumed for different deviations from said characteristic.

22. A control system as in claim 20 in which the station networks include impedances preset to predetermine the relative extents of shift of the telemetering frequencies of the different station channels for a given deviation from said characteristic.

23. A control arrangement for a system load-dispatcher's office comprising balanceable networks in number corresponding with controlled generating stations of the system, means at the load-dispatcher's office for concurrently unbalancing said networks in sense and extent corresponding with change of a system variable from a predetermined magnitude thereof, adjustable impedances in the respective networks, each preset in accordance with the proportion of system load changes to be carried by the corresponding station, a telemetric link for each of the stations including an adjustable impedance, and means for rebalancing each of said networks at the existing magnitude of the system variable for concurrent control of the respective stations for coordinated proportional sharing of the load changes.

24. A control system comprising two sources of variable output, said sources being electrical networks and one of said outputs varying with changes in a system variable; means to vary the other of said outputs toward equality with said one of the outputs comprising a means responsive to the difference of said outputs, and an impedance varied by said responsive means to effect flow of charge or discharge current of a capacitor through a resistor providing said other output; and means responsive to attainment of a predetermined value of said one of the outputs to bring said other output to equality therewith and independently of said first-named responsive means, said second-named responsive means including contacts shorting said resistor for said predetermined value of said other output.

25. A control system comprising two sources of variable output, said sources being pneumatic and one of said outputs varying with changes in a system variable; means to vary the other of said outputs toward equality with said one of the outputs comprising means responsive to the difference of said outputs, and a valve varied by said responsive means to effect flow to or from a storage chamber through a constriction, and means responsive to attainment of a predetermined value of said one of the outputs to bring said other output to equality therewith and independently of said first-named responsive means, said second-named responsive means including a by-pass for said constriction.

References Cited in the file of this patent

UNITED STATES PATENTS

| 1,457,052 | Birch | May 29, 1923 |
| 2,366,968 | Kaufmann | Jan. 9, 1945 |
| 2,558,729 | Buechler | July 3, 1951 |